United States Patent [19]

Johnson et al.

[11] Patent Number: 5,055,763
[45] Date of Patent: Oct. 8, 1991

[54] ELECTRONIC BATTERY CHARGER DEVICE AND METHOD

[75] Inventors: William A. Johnson, Holliston; W. James Budzyna, Whitinsville, both of Mass.; Nicholas J. Smilanich, Rocky River; Chi-Thien Doan, Olmstead Falls, both of Ohio

[73] Assignee: Eveready Battery Company, Inc., St. Louis, Mo.

[21] Appl. No.: 248,962

[22] Filed: Sep. 26, 1988

[51] Int. Cl.[5] .............................................. H02J 7/00
[52] U.S. Cl. ....................................... 320/15; 320/21; 320/31; 320/37; 320/39
[58] Field of Search ...................... 320/15, 21, 31, 37, 320/38, 39

[56] References Cited

U.S. PATENT DOCUMENTS

| | | | |
|---|---|---|---|
| 3,786,343 | 1/1974 | Ehlers | 340/249 |
| 3,992,658 | 11/1976 | Bechtold et al. | 320/20 |
| 4,118,661 | 10/1978 | Siekierski et al. | 320/40 |
| 4,284,944 | 8/1981 | Iwanaga et al. | 320/48 |
| 4,385,269 | 5/1983 | Aspinwall | 320/14 |
| 4,388,582 | 6/1983 | Saar et al. | 320/20 |
| 4,392,101 | 7/1983 | Saar et al. | 320/20 |
| 4,395,672 | 7/1983 | Gassaway | 320/31 |
| 4,396,880 | 8/1983 | Windebank | 320/21 |
| 4,549,127 | 10/1985 | Taylor | 320/21 |
| 4,553,081 | 11/1985 | Koenck | 320/43 |
| 4,562,398 | 12/1985 | Kotlarewsky | 320/31 |
| 4,583,034 | 4/1986 | Martin | 320/21 |
| 4,607,208 | 8/1986 | Vreeland | 320/21 |
| 4,629,965 | 12/1986 | Fallon et al. | 320/39 |
| 4,639,655 | 1/1987 | Westhaver | 320/14 |
| 4,670,703 | 6/1987 | Williams | 320/22 |
| 4,677,363 | 6/1987 | Kopmann | 320/44 |
| 4,684,871 | 8/1987 | Plagge | 320/21 |
| 4,710,694 | 12/1987 | Sutphin et al. | 320/21 |
| 4,849,682 | 7/1989 | Bauer et al. | 320/15 |

Primary Examiner—R. J. Hickey
Attorney, Agent, or Firm—Robert W. Welsh

[57] ABSTRACT

A battery charger device and method including a charging circuit having a source of charging energy and connections for installing one or more batteries to be charged, the device having a controllable switch associated with each battery to be charged and a microprocessor for controlling the switches to establish a charging sequence of distinct repeated charging periods for each battery, a display device associated with each battery under control of a microprocessor for individually indicating the charging status of each battery, the microprocessor having inputs at which various parameters with respect to the batteries being charged are applied such as battery voltages, ambient temperatures and charging currents, the microprocessor being programmed to terminate a voltage charging operation with respect to any one or more of the batteries if the measured difference between the charging and non charging voltage of any one or more of the batteries during succeeding charging periods exceeds some predetermined value, or if the charging current, or the ambient temperature of the battery being charged is outside of a predetermined range. The present device and method may also include a back up termination means which responds to measurements of the battery voltage during succeeding charging periods and determines therefrom that on a predetermined number of succeeding cycles the condition of the battery voltage has changed by at least some predetermined amount.

50 Claims, 9 Drawing Sheets

| Start Cycle | End Cycle | # of Cycles | Charge Switch On | A/D Mux Channel | Description of Activity |
|---|---|---|---|---|---|
| 1 | 32 | 32 | None | Ground | Precharge sample cap to 0 volts |
| 32 | 33 | 1 | None | I Ref | Read A/D Input Ground Reference |
| 33 | 58 | 25 | None | Ground | Precharge sample cap to 0 volts |
| 58 | 90 | 32 | None | Cell 1 | Charge sample cap cell voltage |
| 90 | 91 | 1 | None | I Ref | Read A/D to get cell voltage, determine cell qualification for charging |
| 91 | 116 | 25 | None | Ground | Precharge sample cap to 0 volts |
| 116 | 148 | 32 | None | Cell 2 | Charge sample cap cell voltage |
| 148 | 149 | 1 | None | I Ref | Read A/D to get cell voltage, determine cell qualification for charging |
| 149 | 174 | 25 | None | Ground | Precharge sample cap to 0 volts |
| 174 | 207 | 33 | None | Cell 3 | Charge sample cap cell voltage |
| 207 | 208 | 1 | None | I Ref | Read A/D to get cell voltage, determine cell qualification for charging |
| 208 | 233 | 25 | None | Ground | Precharge sample cap to 0 volts |
| 233 | 266 | 33 | None | Cell 4 | Charge sample cap cell voltage |
| 266 | 267 | 1 | None | I Ref | Read A/D to get cell voltage, determine cell qualification for charging |

*Fig. 5A*

| Start Cycle | End Cycle | # of Cycles | Charge Switch On | A/D Mux Channel | Description of Activity |
|---|---|---|---|---|---|
| 1 | 31 | 31 | Cell 1 | Current | Sample current sense resistor |
| 31 | 32 | 1 | Cell 1 | I Ref | Read A/D to get charge current, compute charge duty cycle |
| 32 | 36 | 4 | None | I Ref | Allow power supply to recover |
| 36 | 67 | 31 | Cell 2 | Current | Sample current sense resistor |
| 67 | 68 | 1 | Cell 2 | I Ref | Read A/D to get charge current compute duty cycle |
| 68 | 72 | 4 | None | I Ref | Allow power supply to recover |
| 72 | 103 | 31 | Cell 3 | Current | Sample current sense resistor |
| 103 | 104 | 1 | Cell 3 | I Ref | Read A/D to get charge current, compute charge duty cycle |
| 104 | 108 | 4 | None | I Ref | Allow power supply to recover |
| 108 | 139 | 31 | Cell 4 | Current | Sample current sense resistor |
| 139 | 140 | 1 | Cell 4 | I Ref | Read A/D to get charge current, compute charge duty cycle |
| 140 | 144 | 4 | None | I Ref | Allow power supply to recover |

*Fig. 5B*

| Start Cycle | End Cycle | # of Cycles | Description of Activity |
|---|---|---|---|
| 1 | 1152 | 1152 | Period 1, each cell charged 256 cycles maximum |
| 1152 | 2304 | 1152 | Period 2, each cell charged 256 cycles maximum |
| 2304 | 3456 | 1152 | Period 3, each cell charged 256 cycles maximum |
| 3456 | 4608 | 1152 | Period 4, each cell charged 256 cycles maximum |

*Fig. 5C*

| Start Cycle | End Cycle | # of Cycles | Description of Activity |
|---|---|---|---|
| 1 | 72 | 72 | Subperiod 1, each cell charged 16 cycles maximum |
| 72 | 144 | 72 | Subperiod 2, each cell charged 16 cycles maximum |
| 144 | 216 | 72 | Subperiod 3, each cell charged 16 cycles maximum |
| 216 | 288 | 72 | Subperiod 4, each cell charged 16 cycles maximum |
| 288 | 360 | 72 | Subperiod 5, each cell charged 16 cycles maximum |
| 360 | 432 | 72 | Subperiod 6, each cell charged 16 cycles maximum |
| 432 | 504 | 72 | Subperiod 7, each cell charged 16 cycles maximum |
| 504 | 576 | 72 | Subperiod 8, each cell charged 16 cycles maximum |
| 576 | 648 | 72 | Subperiod 9, each cell charged 16 cycles maximum |
| 648 | 720 | 72 | Subperiod 10, each cell charged 16 cycles maximum |
| 720 | 792 | 72 | Subperiod 11, each cell charged 16 cycles maximum |
| 792 | 864 | 72 | Subperiod 12, each cell charged 16 cycles maximum |
| 864 | 936 | 72 | Subperiod 13, each cell charged 16 cycles maximum |
| 936 | 1008 | 72 | Subperiod 14, each cell charged 16 cycles maximum |
| 1008 | 1080 | 72 | Subperiod 15, each cell charged 16 cycles maximum |
| 1080 | 1152 | 72 | Subperiod 16, each cell charged 16 cycles maximum |

*Fig. 5D*

| Start Cycle | End Cycle | # of Cycles | Charge Switch On | A/D Mux Channel | Description of Activity |
|---|---|---|---|---|---|
| 1 | 16 | 16 | Cell 1 | Current | Charge Cell 1 |
| 16 | 32 | 16 | Cell 2 | Current | Charge Cell 2 |
| 32 | 48 | 16 | Cell 3 | Current | Charge Cell 3 |
| 48 | 64 | 16 | Cell 4 | Current | Charge Cell 4 |
| 64 | 72 | 8 | None | | Allow power supply to recover |

*Fig. 5E*

ELECTRONIC BATTERY CHARGER DEVICE AND METHOD

BACKGROUND OF THE INVENTION

There are in existence devices for charging and recharging various types and sizes of storage batteries including the larger wetcell type batteries as well as smaller drycell batteries such as nickel-cadmum (Ni-Cd) battery cells and the like. The present invention is directed primarily to those chargers used for charging dry cell batteries such as Ni-Cd and related type batteries sometimes also referred to by and including designations such as AA, AAA, C, D, and 9 V batteries.

Known commercial chargers for these types of batteries or cells fall into two general catagories, namely the trickle chargers and so called one hour chargers. The trickle chargers generally provide a partially regulated charge rate, typically in the range of 15-150 milli-Amperes (ma) of charging current. Such chargers do not ordinarily include means to protect against reverse charging voltages or against overcharging, and such devices are slow to charge usually requiring charging periods in the range of 14 hours and longer for charging a battery such as a C battery. This will vary somewhat for other cells and other charging rates.

The one hour chargers, on the other hand, are designed mainly for charging cell packs such as portable tool cell packs often included in tools such as power drills and the like. The power packs used in such devices are multi-cell packs with the individual cells connected in series to produce a voltage output that is greater than the output of the individual cells. Such cell packs may have built into them thermostatic sensing devices which operate to terminate a charging operation if the battery temperature exceeds some predetermined amount.

No known device, however, has means for individually and selectively fast or trickle charging one or more cells independently of others and wherein certain conditions of each cell are monitored and used to control means to determine the charge rate to be used and/or if a particular cell is to be charged at all. Furthermore, no known battery charger device includes means for making calculations and determinations as to certain conditions of each of a plurality of batteries being charged in order to control whether to fast or trickle charge, or to terminate a charging operation under certain conditions or determine whether a particular battery can accept a fast or only a trickle charge. Still further, no known battery charger includes a microprocessor capable of responding to certain parameters individually as to a plurality of batteries connected to be independently charged and using such information to make calculations and determinations which control if and how a battery is to be charged, and no known battery charger has means under control of a microprocessor for individually indicating for each battery being charged the type of charging it is undergoing. Also no known battery charger senses the difference between the battery voltage during a charging (closed circuit voltage—CCV) operation and the battery voltage when the battery is not being charged (open circuit voltage—OCV) and processes differences to terminate a charging operation when the actual value of this process result exceeds the minimum value of this difference during a charging operation by some predetermined difference usually espressed as a ratio. Also no known battery charger has means to terminate a charging operation such as if the open circuit voltage (OCV) exceeds some predetermined value, or if the condition of the open circuit voltage changes in some predetermined manner, if the closed circuit voltage exceeds some predetermined threshold value, if the charging cycle times out, i.e. exceeds some predeterminted charging time, such as 60 minutes or if the ambient temperature exceeds or is less than some predetermined temperature.

No known battery charger calculates a divergence between open and closed circuit voltages of a battery being charged and includes means for retaining the minimum value thereof during a charging operation for comparison with the instantaneous value of the same voltage difference to determine when the ratio therebetween is such that a charging operation should be terminated.

It is a principal object of the present invention to provide a battery charger device that includes means that can make a determination as to whether a battery or cell to be charged can be subjected to a fast charge to reduce the required charging time or must be more slowly trickle charged or not charged at all.

Another object is to provide means sensitive to ambient temperature and/or cell voltage for determining if a battery or cell can be subjected to a fast charge condition.

Another object is to provide a battery charger device that includes means capable of individually evaluating a plurality of batteries or cells of the same or of different kinds and with the same or different existing charge levels to be charged to determine which can be fast charged and which can not and proceeding to charge them accordingly.

Another object is to provide a battery charger device having means capable of individually monitoring selected conditions of one or more batteries during charging thereof.

Another object is to sense battery voltage during on-charge (closed circuit) and off-charge (open circuit) times, using the difference between these voltages for each individual battery or cell over the charging cycle to determine when to terminate charging.

Another object is to provide a battery charger device that is safe to use and very unlikely to damage batteries being charged thereby.

Another object is to provide an improved microprocessor controlled battery charger.

Another object is to provide improved software for controlling a battery charger device.

Another object is to miminize the time required to charge batteries.

Another object is to provide a battery charger with means to terminate a charging operation for a battery when the ambient temperature is less than or exceeds some predetermined temperature.

Another object is to provide a microprocessor controlled visual display that indicates the individual charge status of a plurality of batteries or cells connected thereto to be charged.

Another object is to use open circuit and closed circuit battery voltages during a charging operation to determine some of the conditions that can be used to terminate a charging operation.

Another object is to terminate a battery charging operation after the lapse of some predetermined charging time interval.

Another object is to terminate a battery charging operation if the rate of change of the battery voltage exceeds some minimum amount.

Another object is to provide a wide range of detectable conditions that can be used to terminate a battery charging operation.

Another object is to teach the construction and operation of a battery charging device which is more versatile and safer to use from the standpoint of the batteries being charged than any known device used for the same or similar purposes.

Another object is to terminate a battery charging operation based on a predetermined change in the condition of the open circuit voltage.

These and other objects and advantages will become apparent after considering the following detailed specification of a preferred embodiment of the subject device in conjunction with the accompanying drawings.

BRIEF DESCRIPTION OF THE DRAWINGS

The present device is designed and constructed to take into account the needs and conditions of each individual cell or battery being charged by monitoring the ambient temperature and voltage including the open circuit voltage (OVC) and the closed circuit (on-charge) voltage (CCV) of each individual cell and using this information to make calculations from which the charging operation can be controlled and, when necessary, terminated. The present device also includes means to determine from the ambient temperature and from the charging current and from the cell voltage whether these parameters are within specified ranges in order to determine whether a charging operation should be terminated and in some cases prevented altogether. In addition, the device includes means to determine electrically and/or mechanically whether a particular cell is suitable for fast charging or if it must be trickle charged. This can be accomplished mechanically by a feeler or sensor or by observing the voltage profile produced as a result thereof. In the case of a mechanical feeler or sensor, such a device can include means which detect some physical characteristic of the cell such as detecting a groove or indentation at a particular location, the diameter or other characteristics of the positive terminal cap or detecting or reading some other electrical or mechanical means on or attached to the cell.

DETAILED DESCRIPTION OF THE PREFERRED EMBODIMENT

Figure 1:
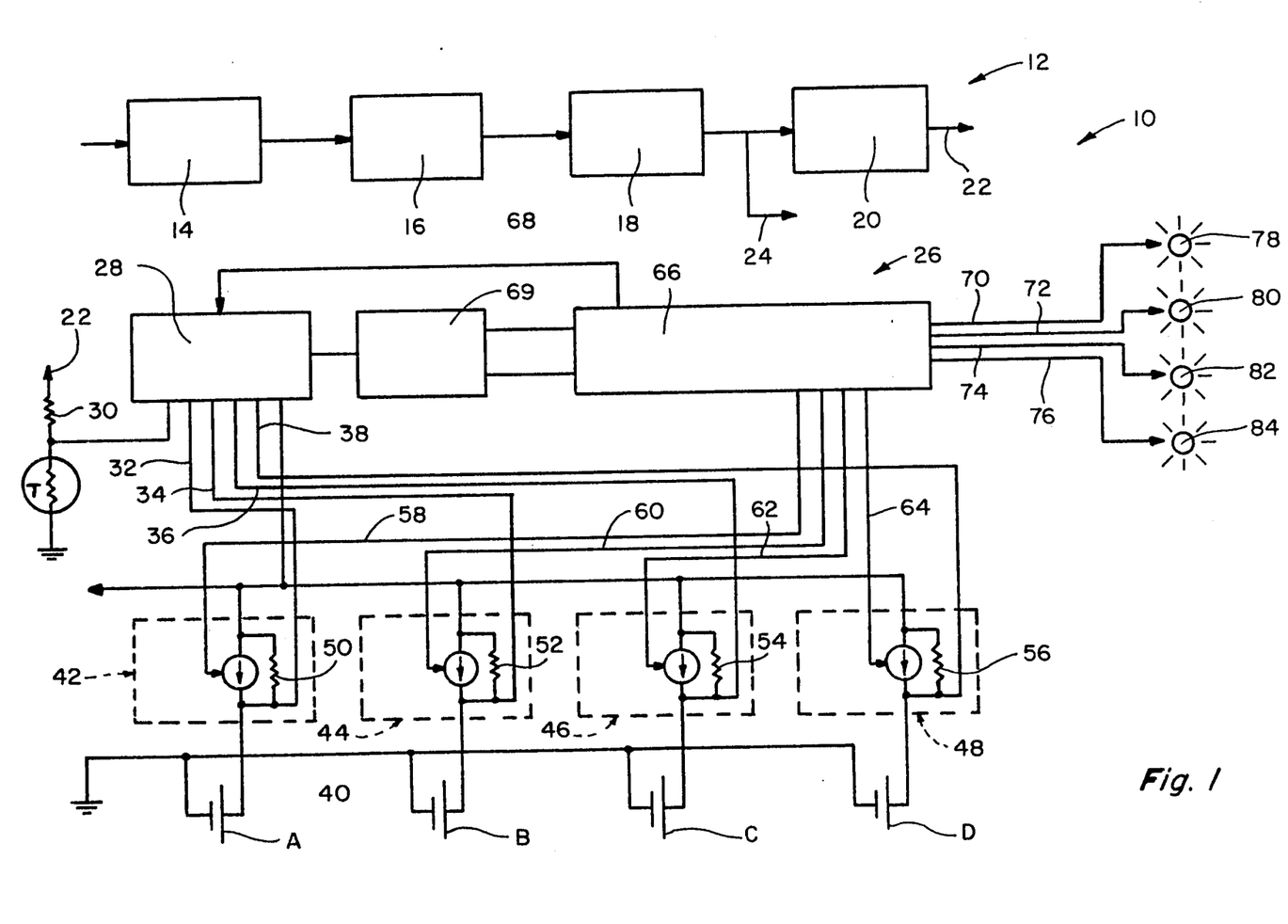
FIG. 1 is a block diagram of a battery charger constructed according to the present invention.
Figure 2:
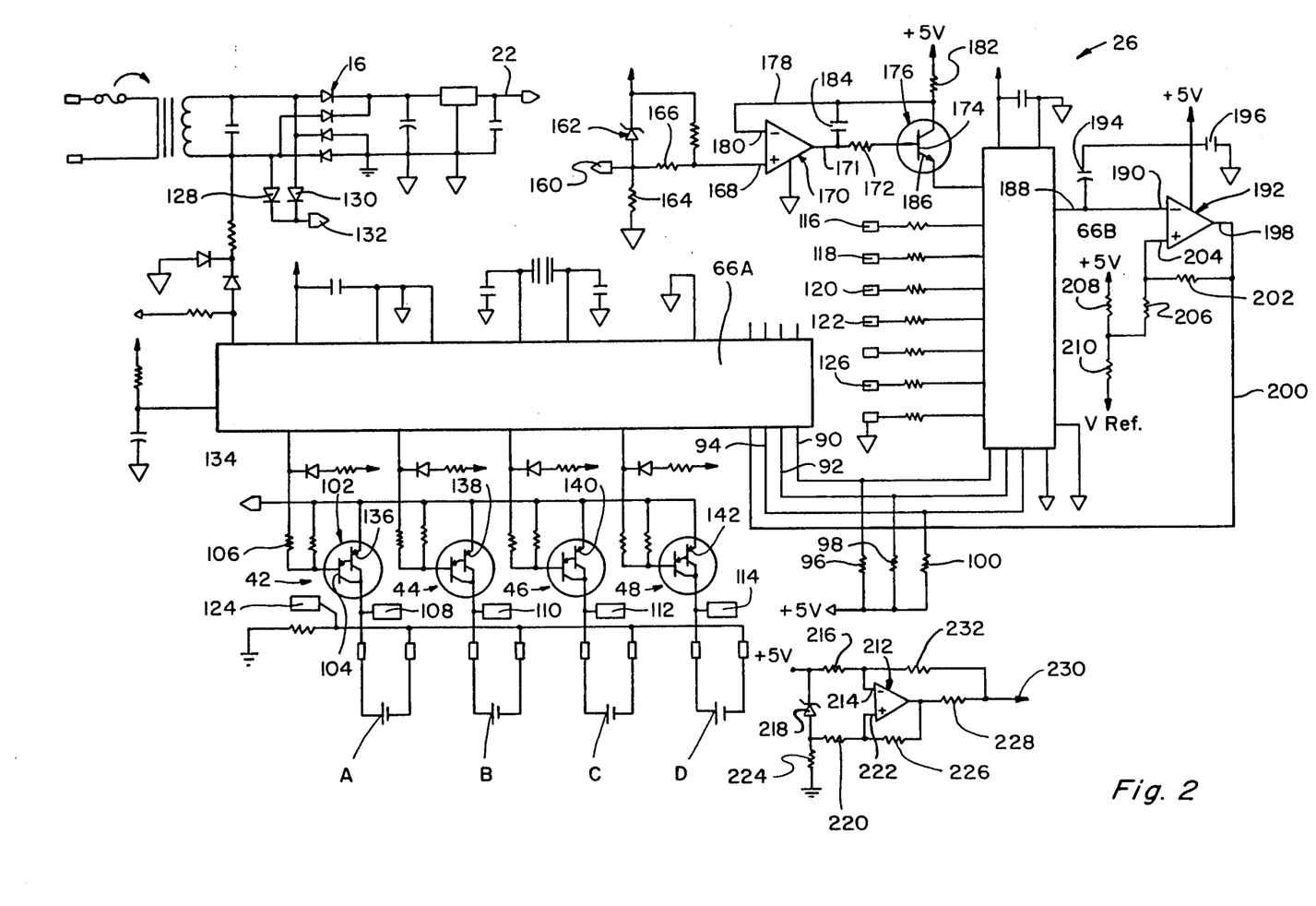
FIG. 2 is a schematic circuit diagram of the subject battery charger.
Figure 3:
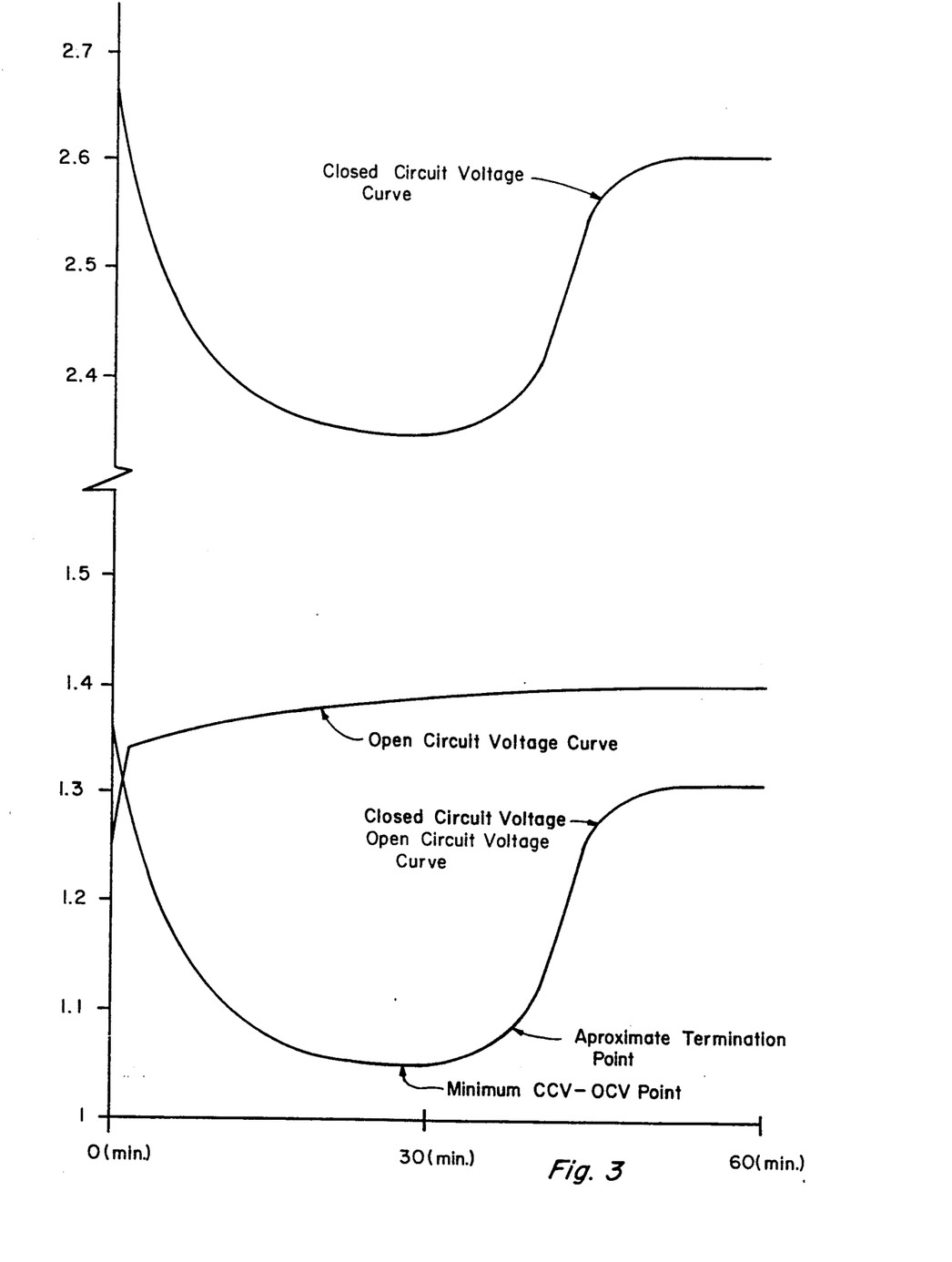
FIG. 3 is an idealized graph of the open and closed circuit battery voltages and the difference therebetween taken at different times during a battery charging operation.

Referring to the drawings more particularly by reference numbers, number 10 refers to a block diagram of a battery charger circuit constructed according to the teachings of the present invention. The circuit 10 has a power supply 12 which includes an input transformer 14, a rectifier 16, a filter 18, and a voltage regulator 20. The power supply 12 produces a regulated output voltage on lead 22 and an unregulated output voltage on lead 24. Connections are made from the leads 22 and 24 to various locations in the circuit, more of the details of which are shown in FIG. 2. The circuit is generally identified by number 26.

Referring again to the block diagram of FIG. 1 the circuit 26 includes a multiplexer 28 which has its input connected through resistor 30 to the regulated power supply output 22. The multiplexer 28 has other inputs 32, 34, 36, and 38 connected to positive terminals of respective batteries or cells A, B, C, and D to be charged. The opposite or negative terminals of the batteries A, B, C, and D are grounded by lead 40. The positive terminal of each of the batteries, such as battery A, is also connected to one side of a cell control device or circuit 42 (or 44, or 46, or 48), each of which control circuit in turn has an optional respective resistor 50 (or 52, 54, or 56) connected thereacross. Each cell control device also has a respective connection 58, 60, 62, and 64 to an output of microprocessor 66. The microprocessor 66 produces first outputs on leads 68 which are control inputs to the multiplexer 28, and the multiplexer 28 is also connected to the microprocessor 66 through an analog to digital converter (A/D) circuit 69 by the leads as shown. The microprocessor 66 has other output connections 70, 72, 74, and 76 which are connected to respective status devices shown as light emitting diodes (LEDs) 78, 80, 82, and 84. The LEDs provide visual indications as to the charging status of the respective batteries or cells A, B, C, and D. For example, when any one or more of the LEDs 78-84 are on or continuously energized, it means that the corresponding battery or cell is being fast charged. When any one or more of the LEDs 78-84 are in a fast flickering condition, it indicates that the respective batteries or cells are undergoing a fast trickle charge, and when any one or more of the LEDs 78-84 are flickering or blinking more slowly it means that the corresponding batteries or cells are undergoing a slow trickle or maintenance charge. When an LED is de-energized it means that that cell is not being charged. Devices other than LEDs can also be used and the different conditions of the means used can indicate any of the charging conditions as desired. The operation of the circuit including the operation of the cell control devices 42-48 and the microprocessor 66 will be described more in detail in connection with FIG. 2 wherein like parts are identified by the same numbers used in FIG. 1, where applicable.

In FIG. 2 the microprocessor 66 of FIG. 1 is shown as including two integrated circuit chips 66A and 66B, both of which have suitable inputs, outputs and control connections such as clock or strobe controls and power supply connections as required. Typically the chip 66B is a CMOS Analog multiplexer, which in conjunction with Op-amps 170 and 192 to be described later provides the analog portion of an A/D converter. The digital portion of this converter is implemented in microprocessor software. The A/D converter provides the means for the microprocessor to acquire analog quantities such as cell voltages, charging currents and ambient temperature. The microprocessor chips 66A and 66B are also connected to each other by various leads such as by leads 90, 92 and 94, and these leads are shown biased to a positive potential by connections from the regulated output 22 of the power supply through respective resistors 96, 98 and 100.

The batteries A, B, C and D are connected to the microprocessor element 66A through respective similar cell control circuits such as the circuit 42 for the battery A, which circuit is shown as including a Darlington transistor couple or pair 102 in which the base element 104 of one transistor is connected through resistor 106 to the microprocessor 66A. Darlington transistor circuits are characterized by including transistors connected in a cascade configuration, which configuration offers relatively high input impedance and greater gain stability than is available from more conventional transistor circuit connections. A similar Darlington pair is included in each of the control circuits 44, 46 and 48 associated with the batteries B, C and D respectively. Each of the circuits 42, 44, 46 and 48 also has a respective output connection 108, 110, 112 and 114 connected respectively to input terminals 116, 118, 120 and 122 of the chip 66B. The grounded sides of the Darlingtons 42-48 are connected in common by connection 124 to input 126 on the chip 66B. While the circuit is shown using Darlington pairs it is contemplated that other circuit type switching devices such, for example, as silicon controlled rectifiers (SCRs), Mosfets, relays or other mechanical switching devices, bipolar power transistors and the like can also be used.

The power supply 12 described above also has a pair of relatively high current carrying diodes 128 and 130 which are connected on their input sides to the outputs of full wave rectifier 16, and on their output sides to a charging output terminal 132 that is connected to terminal 134. The terminal 134 is connected to the emitter terminals 136, 138, 140 and 142 of corresponding transistors in the respective Darlington pairs in the control circuits 42, 44, 46 and 48. These circuits have suitable associated diodes, resistors and other operative connections including connections to the power supply as shown.

The main control circuit 26 includes other circuit portions, including a source of reference voltage on terminal 160, which has a connection to a common connection between Zener diode 162 and resistors 164 and 166. The opposite side of this circuit is connected to a positive input terminal 168 of operational amplifier (Op-amp) circuit 170, the output 171 of which is connected through another resistor 172 to the base element 174 of transistor 176. The collector of the transistor 176 is connected by lead 178 back to the negative input terminal 180 of the Op-amp 170 and through resistor 182 to the 5 v regulated output of the power supply. A capacitor 184 is included in the connection between the output of the Op-amp 170 and the negative input terminal 180 therefor, and emitter electrode 186 of the transistor 176 is connected as an input to the microprocessor chip 66B. The multiplexer chip 66B also has timing and other operational inputs which may be of conventional construction, and an output 188 which is connected to the negative input terminal 190 of another Op-amp 192 which has a feedback connection through capacitor 194 to the negative input terminal and through capacitor 196 to ground. The same connection is also made to the 5 v regulated output of the power supply.

The output 198 of the Op-amp 192 is connected as an input to the microprocessor chip 66A on lead 200, and is connected through resistor 202 to the positive input terminal 204 of the Op-amp 192. The same positive terminal is connected to the reference voltage through a voltage divider circuit which includes resistors 206, 208 and 210, connected as shown. The other connections to the microprocessor chip 66B are to standard type control circuits and will not be described in detail. It should be noted that the output of the Op-amp 192 that is fed back to the chip 66A on the lead 200 is used to control the terminating of a charging operation when the conditions necessary to cause such have been determined by information sensed and/or computed.

The circuit of the Op-amp 170 can be substituted for by the circuit for the Op-amp 212 as an optional alternative. The Op-amp 212 has a connection to the 5 v regulated source and a negative input terminal 214 connected through resistor 216 to the 5 v regulated source. The same connection is connected through Zener diode 218 and resistor 220 to the positive input terminal 222 of the Op-amp 212. A suitable grounded biasing resistor 224 is also provided. The output of the Op-amp 212 is connected through feedback resistor 226 to the positive input of the Op-amp and through another resistor 228 to the output 230 thereof. The output is also connected back to the circuit negative input terminal of the Op-amp through resistor 232. The circuit of the Op-amp 212 provides an alternate to the circuit of Op-amp 170, and provides feedback control to set the charge rate independently of the cell impedance, cell voltage variations and line voltage fluctuations. It is also expected that the microprocessor will use the measured charging current of each cell to adjust the charge duty cycle to provide a precise average charging current.

It is to be understood that the microprocessor 66 (66A and 66B) will be programmed to perform the necessary functions by software which controls the microprocessor in a unique manner as will be more fully understood by reference to the flow charts. It should be understood that the microprocessor must receive the necessary input data required including data as to the open circuit and closed circuit voltage condition of each individual cell being charged and to produce outputs which will determine, among other things, when to terminate a charging operation. From certain information the microprocessor receives it can determine whether any one or more of the cells is capable of being fast charged or should only be trickled charged and whether any of the cells should not be charged at all. The information obtained can also be used to determine from an electronic or mechanical sensor or feeler means whether a particular cell is capable of receiving a fast charge, and if not, to trickle charge that cell or not charge it at all. It will be apparent from what has been said that the present device is able to charge one or more batteries or cells, even batteries or cells of different types and charge status such as fully or partially charged batteries or cells, and to individually continuously or intermittently monitor several different parameters for each of the batteries or cells such as on and off charge (closed and open circuit) voltages to determine if a cell or cells can continue to be fast charged, should be trickle charged, has been fully charged, or should not be charged at all. This is done by monitoring the ambient temperature, charging current, and the on and off charge voltages of each of the cells. The microprocessor will also control the sequence of operation including the initialization sequence, the charging sequence and the time when the various parameters are read for evaluation as will be described.

Figure 5A:
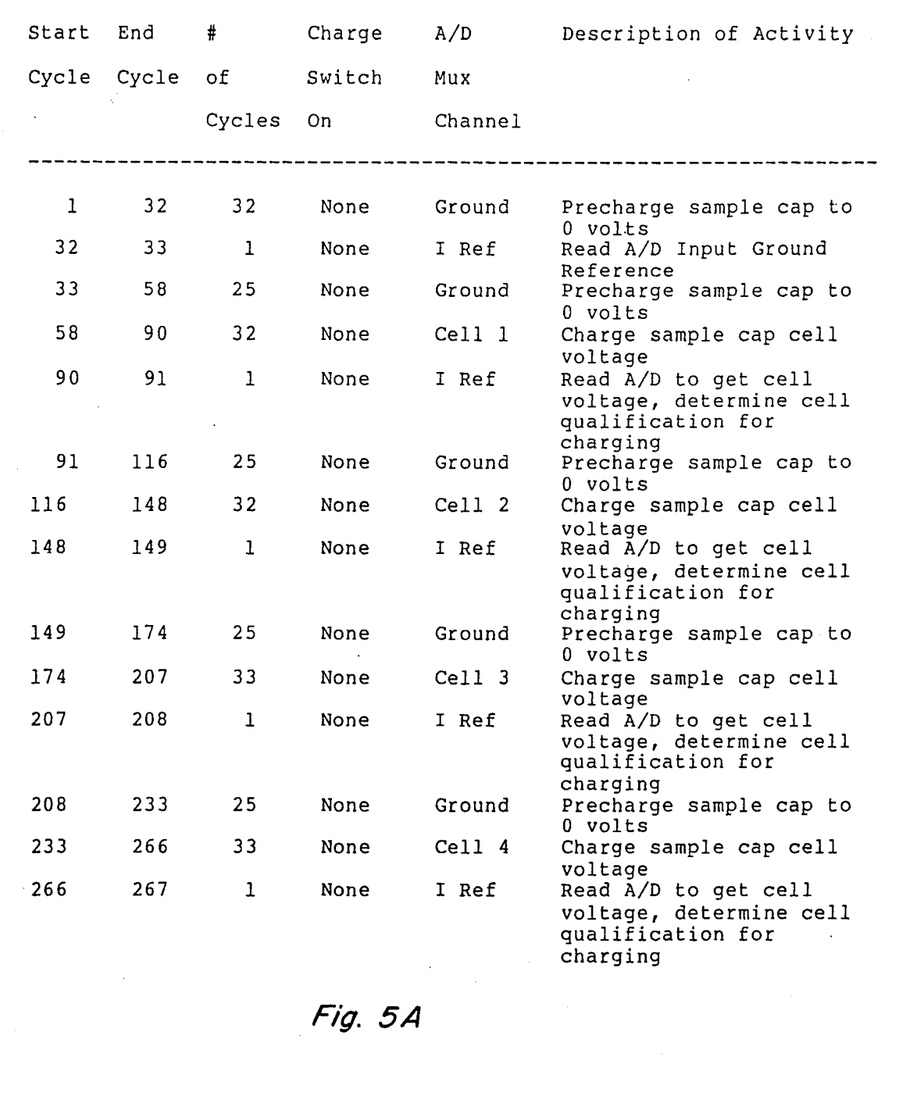
FIGS. 5A, 5B, 5C, 5D and 5E are time or sequence tables that illustrate when various functions and operations take place.

FIG. 5A shows a typical time sequence table for the subject charger during the voltage qualification phase of the circuit operation. During this phase of the operation all of the charge switches are off so that none of the cells will be charged. This table shows an initial time period of 32 cycles which is provided to establish the reference conditions. Thereafter, each succeeding group of time intervals relates to one of the 4 different cells or batteries to be charged. For example, with respect to cell 1, a period of 25 cycles is provided for the purpose of precharging a sample capacitor to zero volts. The next period of 32 cycles is used to charge the sample capacitor to bring it up to the voltage of the cell, and a final cycle is provided during which the cell voltage is read and used to make a determination as to whether the cell in question is capable of receiving a charge. A similar procedure is used with respect to each of the other cells 2, 3 and 4.

Figure 5B:
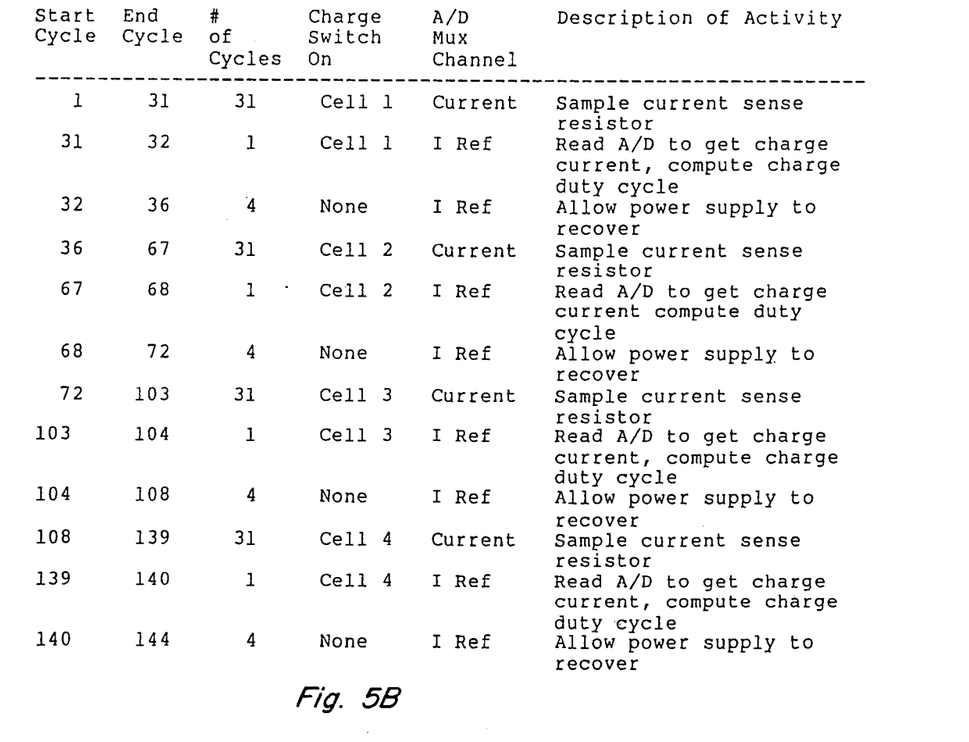

After the qualification phase is completed a charge current calibration phase (FIG. 5B) takes place. This phase takes 36 cycles to complete for each of the cells. The first 31 cycles are used to sample a current sense resistor for cell 1, followed by the next cycle which is provided to read the charge current which is then used to compute the charge duty cycle. The final four cycles for cell 1 are provided to allow the power supply to recover. A similar procedure is applied in sequence with respect to cells 2, 3 and 4.

Figure 5C:
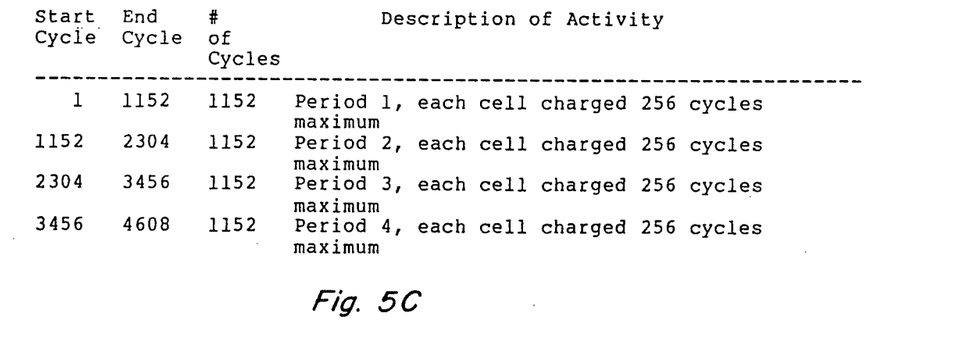

In FIG. 5C is shown the charge phase sequence table, each sequence of which consumes 1152 cycles. Two hundred fifty six cycles of each sequence represent the maximum number of cycles available to be used to charge each of the 4 cells. The sequence is subdivided into four equal time periods, one for each cell, so that each cell can receive up to a maximum of 4×256 cycles of charging time.

Figure 5D:
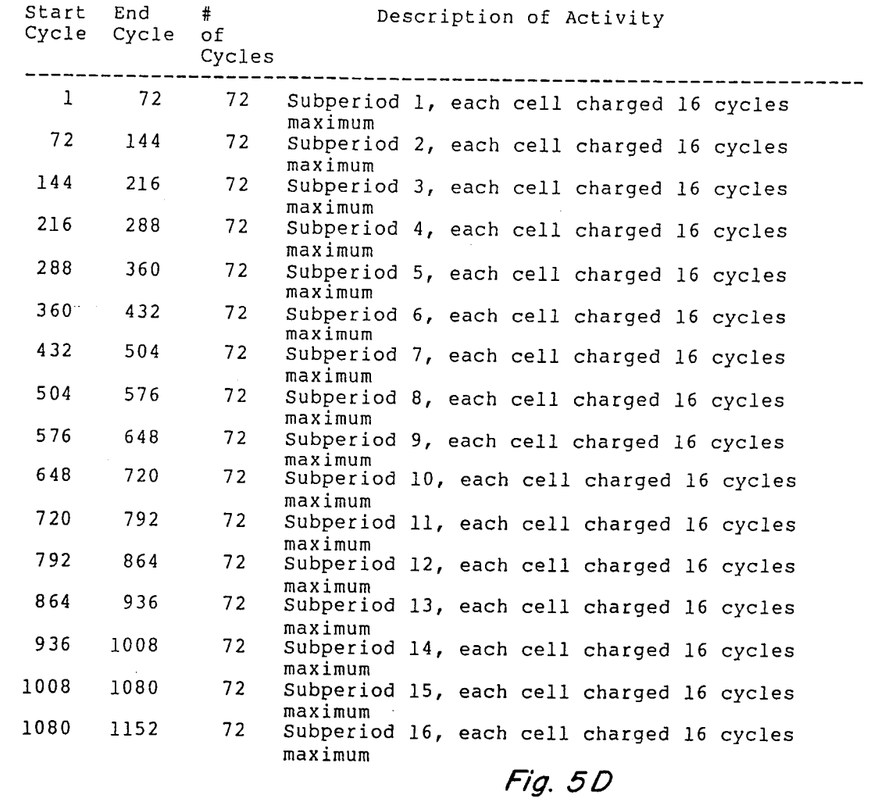

FIG. 5D shows a further break down as to what happens during each of the 4 periods of the sequence shown in FIG. 5C. The entire table shown in FIG. 5D represents one of the periods illustrated in FIG. 5C. For example, the total time of a charge period as illustrated in FIG. 5D is 1152 cycles. This period shown broken down into 16 subperiods, each subperiod charging one of the 4 cells during a maximum of 16 cycles.

Figure 5E:
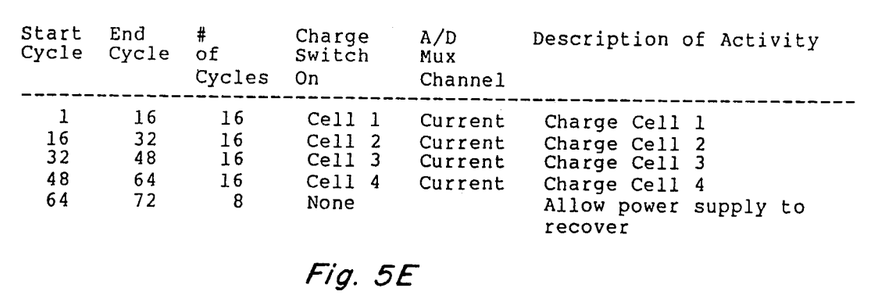

FIG. 5E illustrates the sequence of the charge subperiod during one of the 16 subperiods shown in FIG. 5D. In this table it can be seen that cell 1 receives 16 cycles, as also do cells 2, 3, and 4, and 8 cycles of each subperiod are not used so as to allow the power supply to recover between subperiods. Familiarity with the tables shown in FIGS. 5A–5E will help in understanding the sequence and subsequences of operation that take place under control of the subject battery charger. The sequence is controlled by the microprocessor and the length of the various time periods can be varied as required by the particular cell or cells to be charged.

Figure 4A:
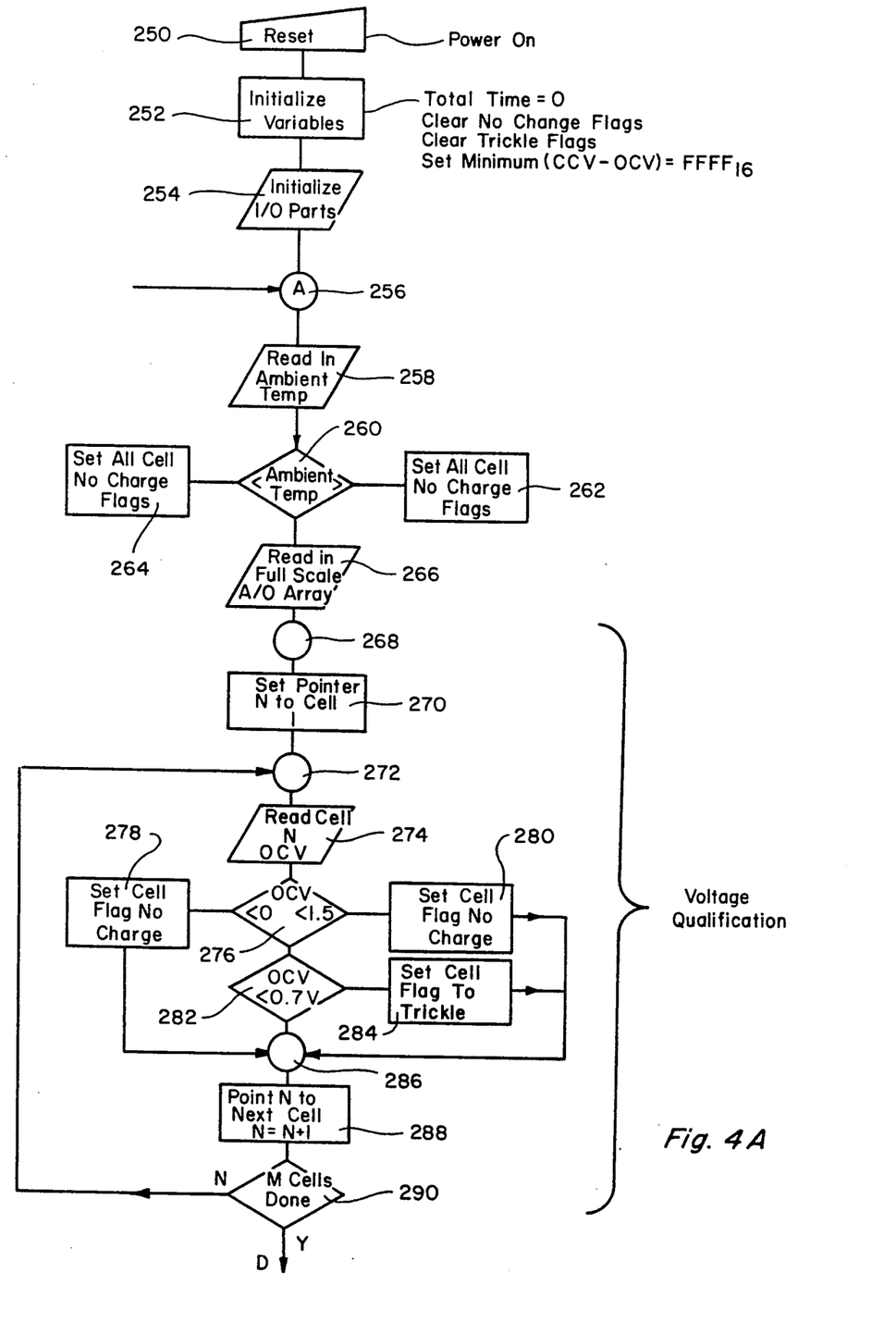
FIGS. 4A, 4B and 4C together constitute a flow chart for the subject battery charger.
Figure 4B:
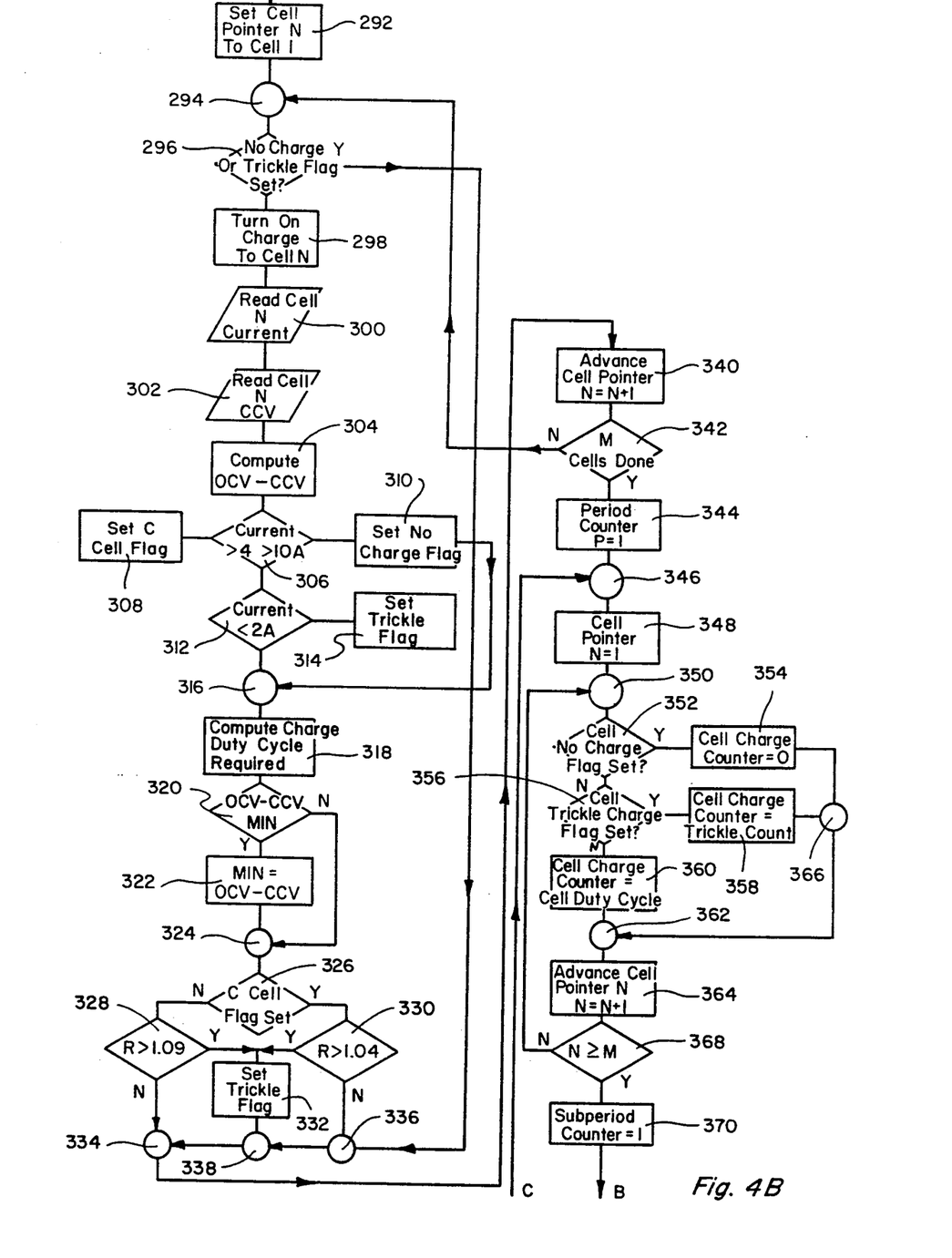
Figure 4C:
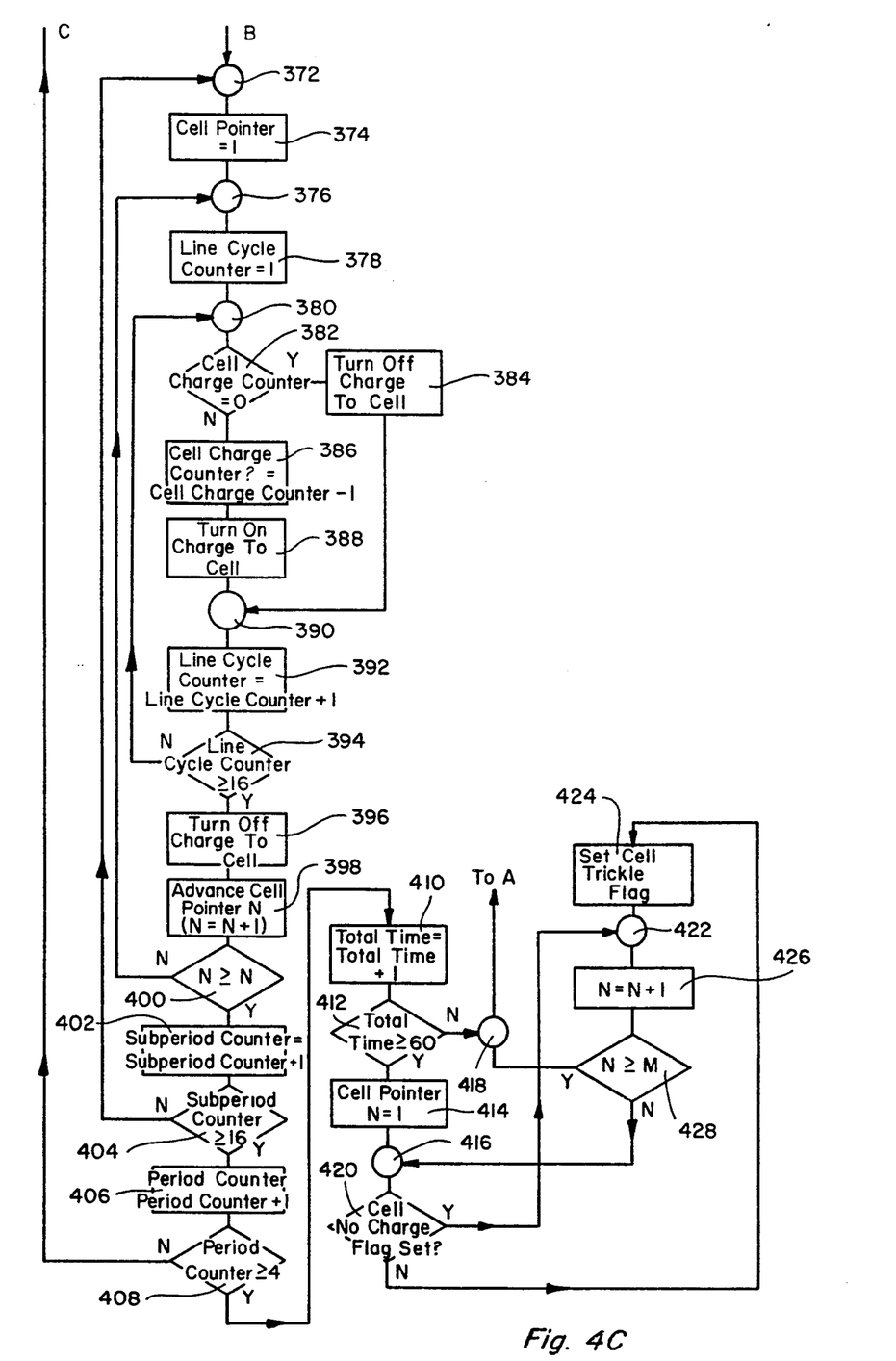

FIGS. 4A, 4B and 4C together constitute the flow chart for the subject battery charger. When the power is turned on by actuating a switch such as reset switch 250, the circuit of the microprocessor will be initialized under control of initializing block 252 to establish the various initial conditions necessary to proceed with a battery charging operation. Among the things that need to be initialized include establishing a zero or beginning time for a charging operation. Initializing will also clear any "no charge" flags that may exist, it will clear any "trickle" charge flags and it will establish a beginning or initial condition for the minimum difference between the closed circuit voltage (CCV) and the open circuit voltage (OCV). The initial setting of the minimum (CCV−OCV) or (OCV−CCV) will be greater than the expected minimum difference between these voltages that will occur during a charging operation. In other words, it is expected that during a charging operation the absolute value of the difference between the closed circuit voltage and the open circuit voltage will decrease from its initial setting to some value lower than that initial setting and each new minimum difference detected will replace the previous stored minimum and will be compared with each new value of the same difference, and when the difference between the present value and the stored minimum value equals or exceeds some predetermined amount the fast charge operation will be terminated. This can be expressed as (CCV−OCV)/(CCV−OCV) minimum.

Once the initializing variables have been established as described above, an initializing signal will be sent to block 254 labeled "Initialize Input/Output" which produces an output at gate 256 labeled (A). This will cause an ambient temperature condition being sensed by a suitable sensor device to be read into the circuit. The sensed ambient temperature condition may preempt the operation of the circuit if it is either too high or too low and prevent a charging operation from taking place. The sensed ambient temperature is applied to block 258 which in turn feeds its output to ambient temperature block 260 where the sensed temperature, if it is out of range on the high or low side, will operate a control flag for too high block 262 or control flag for too low block 264. If either block 262 or 264 is actuated a "NO Charge flag" will be produced and a corresponding signal will prevent a charge operation from taking place with respect to all batteries or cells that may be connected into the system. Assuming, however, that the ambient temperature is within the range necessary for a battery charging operation to take place, the output of the block 260 will be applied to block 266 labeled "Read In Full Scale Analog-To-Digital (A/D) Array". This block will cause a signal to be applied through terminal 268 to block 270 labeled "Set Pointer N To Cell (battery) 1". The block 270 has its output connected to one of two inputs of gate 272, which gate has its output connected to block 274 labeled "Read Cell N OCV". This causes the open circuit cell voltage to be read before energy is applied to cell 1 to charge it.

The output of the block 274 is fed as an input to block 276 labeled "OCV". This block has an output labeled "Less Than Zero volts (<0)", and another third output labeled "Greater Than 1.5 Volts (>1.5)." If the OCV of the cell is less than 0 volts, or negative, block 278 connected thereto and labeled "Set Cell Flag No Charge" will take over to prevent cell 1 from being charged. In like manner if the OCV of the cell is greater than 1.5 volts another block 280 labeled "Set Cell Flag No Charge" will operate to prevent the same cell from being charged but for a different reason. In other words, for a cell or battery to be charged, its open circuit voltage (OCV) must be between some preestablished values for that cell such as between 0 and 1.5 volts in the flow chart as shown. If the OCV is between these values, neither of the "No Charge" flags will be set and the block 276 will produce an output for applying to another block 282 labeled "Open Circuit Voltage less than 0.7 volts (<0.7)". The block 282 will produce an output to activate a block 284 labeled "Set Cell Flag To Trickle" if the open circuit cell voltage is less than 0.7 volts. This will cause the cell in question to be trickle charged rather than fast charged. If, on the other hand, the open circuit cell voltage is between 0.7 and 1.5 volts the block 282 will produce an output that will be applied as an input to gate 286 which receives other inputs from the blocks 278, 280 and 284. If the gate 286 receives an input from block 278 or 280 no charge on cell N will be possible. If the gate 286 receives an input from block 284, the gate will cause a trickle charge operation to take place, and if the gate 286 receives an input from block 282, cell N will be initialized to receive a fast charge operation. Once a particular condition has been established for cell N, the output of the gate 286 will be applied on an input to block 288 labeled "Point N To Next Cell (N=N+1)". The procedure just gone through established which cells are to be fast and which are to be trickle charged and which are not to be charged at all. The actual charging is under control of another portion of the flow chart and of the sequence charts in FIG. 5A–5E. The same OCV reading and evaluation procedure will be used for each cell or battery in order in the device so that it can be determined which cells are to be charged. It can therefore be seen that the OCV of each cell is an important bit of information that is available to be read before each charging operation takes place and from which the device can determine whether a charge can be applied, and, if so, whether the cell can receive a fast charge, a trickle charge, or not charge at all.

The block 288 produces an output that is applied to block 290 labeled "M Cells Done" which block controls means to keep track of which of the cells have been read. If N does not equal M, that is, if the OCV for each cell has not been read and characterized, then the above-described procedure is performed for the unread cells, and appropriate control flags are set. If, on the other hand, the OCVs for each cell have been read, that is, if M=N, then the block 290 will produce an output that is applied to block 292 labeled "Set Cell Pointer N to Cell 1". The output of block 292 is applied to gate 294 which also receives inputs from another block also labeled "M Cells done" which will be described hereinafter and which controls which cells will receive charging current and which will not based on the conditions thereof.

The outputs of the gate 294 are applied as inputs to a block 296 labeled "No Charge Or Trickle Charge Flag Set?". The block 296 has two outputs, one of which applies inputs to block 298 labeled "Turn On Charge To Cell N" which causes the cell involved to receive a charge on the succeeding charge cycle. The block 298 produces an output for applying the block 300 labeled "Read N Cell Current" to cause the reading of the current in Cell N and to apply a signal to block 302 labeled "Read Cell N CCV" to cause the same N cell to have its closed circuit voltage (CCV) read.

The output of the block 302 is used to cause block 304 to produce a computation by subtracting OCV from the previously hence CCV, hence to produce an absolute value for the difference voltage (CCV-OCV). This is an important computation for several reasons as will be explained.

The outputs of the CCV-OCV computer block 304 are applied as inputs to block 306 labeled "Current". The block 306 has a first output labeled greater than 4 amp (>4A) connected to block 308 labeled "Set C Cell Flag". This connection is provided to cause a fast charge operation to take place. The block 306 has a second output labeled "Greater than 10 amperes (>10A)" which is connected to block 310 labeled "Set No Charge Flag" which prevents a charge operation from taking place when the current is greater than 10 amperes which is virtually a short circuit condition. The block 306 also has a third output connected to block 312 labeled "Current <2A". If the current as measured at block 306 is less than 2 amps, which means the cell is almost fully charged, the block 312, which has a connection to block 314 labeled "Set Trickle Charge", causes a trickle charge operation rather than a fast charge to take place for that cell during the next charge cycle.

The block 312 has another output connected to gate 316, which gate also received inhibit inputs from block 310 to inhibit a charge operation. If neither a trickle charge or a no charge condition exists the gate 316 will apply an output to block 318 labeled "Computer Charge Duty Cycle Required", which block will operate to establish the length of time a charge is to be applied to a cell. The charge time may vary from cell type to cell type and can be a preestablished time which is programmed into the microprocessor.

The output of the block 318 is connected to block 320 labeled "(CCV−OCV)<MIN." This comparison calculation is made to determine the value of the difference between CCV and OCV during each charge cycle for each cell so that the previously stored minimum difference can be replaced and updated by a new minimum value each time a new minimum or lesser value is calculated. This is very important since the minimum value for this difference is the value that is compared with or divided into each newly calculated value of this difference to determine when to terminate a charge operation. This occurs when the ratio of a newly computed value to the stored minimum value exceeds a predetermined amount. When it does, it signals that that cell or battery is fully charged. These calculations and this procedure take place individually for each cell being charged so that charge termination will be different for each cell depending on when the difference between CCV and OCV equals or exceeds the minimum stored value of this difference for a cell typically by some amount or ratio such as 1.09 or 1.04 or some other preset value.

The block 320 has a first output connected to block 322 labeled "MIN=(CCV−OCV)" which block only accepts differences between CCV and OCV that are less than the minimum value of the difference previously stored. If a difference computed is not less than the minimum stored difference no updating will take place and a second output of the block 320 will be applied to gate 324, otherwise the gate 324 will receive the new minimum difference entered under control of the block 322.

The gate 324 has its output connected to block 326 labeled "C Cell Flag Set" which block has YES and NO outputs. The NO output is connected to block 328 labeled R>1.09, and the YES output is connected to block 330 labeled R>1.04. If either of the blocks 328 or 330 receive a response meaning that the difference between the new computed value of CCV−OCV is greater than the minimum stored value by a ratio of 1.09 or 1.04, it means that the cell or battery in question is fully charged and the charge cycle for that cell is completed and charging should be terminated. At the same time this response also initiates a trickle charge by a signal applied to block 332 labeled "Set Trickle Flag." In this case the trickle charge is a maintenance charge.

The blocks 328, 330 and 332 have connections to respective gates 334, 336 and 338 which are connected as shown, and have a common output from the gate 334 to the input of block 340 labeled "Advance Cell Pointer (N=N+1)." The effect of this is to advance to the charge cycle of the next cell to be charged in order so that the steps described above can be repeated. This will reoccur for each battery connected to the charger so that the charging of each battery is individualized.

The output of the block 340 is applied to block 342 labeled "M Cells Done" which has a first output connected back as an input t the block 294 described above to indicate which cells have been fully charged and which have not. The block 342 also has a YES output connected to the input of block 344 labeled "Period Counter P=1" which initiates a sequence or order by charging periods, period 1 being the period for charging the first battery in the sequence and so on.

The outputs of the block 344 are applied to gate 346 which block also received other inputs from the gate 408 described below. These inputs control whether a battery undergoes a further charge cycle or not depending on whether it has been determined to be fully charged. Keep in mind that the sequence will not vary because of these signals but a battery that is fully charged will not again be fast charged during its assigned charging periods. The output side of the gate 346 is connected to the input of block 348 labeled "Cell Pointer N=1" which starts a charge cycle for the next cycle of operation which may or may not be the first battery in the sequence. The output side of the block 348 is connected to another gate 350 which receives other signals from block 368 which will be described later.

The gate 350 is connected to block 352 labeled "Cell No Charge Flag Set?" which has a YES output (when no charge is to be applied) connected to block 354 labeled "Cell Charge Counter=0". The block 352 has its NO output (when a charge is to be applied) connected t block 356 labeled "Cell Trickle Charge Flag Set" which has its YES output connected to block 358 labeled "Cell Charge Counter=Trickle Count". If neither blocks 354 or 358 are in their YES conditions the signal on the NO output of the block 356 will be applied to the input of block 360 labeled "Cell Charge Counter=Cell Duty Cycle" to cause a signal to be applied to gate 362 and in turn to block 364 labeled "Advance Cell Pointer N; N=N+1" to commence the next charge operation. If either of the blocks 352 or 356 are in their YES condition so that the block 354 or 358 receive outputs therefrom, they will in turn apply their respective output to gate 366 which in turn will operate to prevent the gate 362 from passing the output of block 360 to block 364.

The block 364 has its output connected to block 368 labeled "N≧M", which block has its NO output connected back to the gate 350 described above, and its YES output connected to block 370 labeled "Subperiod Counter=1". This block has its output connected to the input of gate 372 which receives other inputs from a subperiod counter to be described later. The output of the gate 372 is connected to block 374 labeled "Cell Pointer=1" which establishes that cell 1, unless already fully charged, will be charged. The output of the block 374 is applied as one of two inputs to gate 376, the other input of which is connected to a block labeled "N≧N" also to be described later. The gate 376 is connected to block 378 labeled "Line Cycle Counter=1" which establishes the beginning of a charging cycle, and has its output connected as one of two inputs to another gate 380. The other gate input is connected to a block labeled "Line Cycle Counter≧16" which is downstream and will be described later.

Next in order is block 382 labeled "Cell Charge Counter=0". This block has a YES output connected to block 384 labeled "Turn Off Charge To Cell" which operates to turn off a fast charge operation if the block 382 indicates that no charge is actually taking place. The NO output of the block 382 is connected to the input of block 386 labeled "Cell Charge Counter=Cell Charge Counter−1". The block 386 operates to advance the charging operation to the next cell to be charged.

The output of the block 386 is applied to the input of block 388 labeled "Turn On Charge To Cell". When the block 388 receives an input it causes a charge to be applied to the next cell in order. If a charge is taken place when the block 382 goes from a NO to a YES condition to activate the block 384, the output of the block 384 acts by applying an inhibit input to gate 390 to prevent the output of the block 388 from being applied through the gate 390 to the input of block 392 and in so doing discontinues an in-process charge operation.

The gate 390 is connected to block 392 labeled "Line Cycle Counter=Line Cycle Counter+1". This block controls means to advance the charging operation such as to the next non fully charged battery in sequence to be charged. The output of the block 392 is connected to block 394 labeled "Line Cycle Counter≧16" which operates to time out a predetermined charging period shown for illustrative purposes as being 16 cycles in duration. The block 394 has a NO output connected back as the second input to the gate 380 to terminate an in process charging operation on the battery being charged, and a YES output connected to block 396 labeled "Turn Off Charge to Cell". When this occurs, the block 396 impulses block 398 labeled "Advance Cell Pointer N (N=N+1)" to advance the circuit to a condition to charge the next battery in the sequence. This condition continues until the output of block 398 applies an input to block 400 labeled "N≧N" which has NO and YES outputs. The NO output is connected back as a second input of the gate 376 described above, and the YES output is connected as an input to block 402 labeled "Subperiod Counter=Subperiod Counter+1" in preparation for the next sequence of charging cycles to be applied to the next cell in order. The output block 402 is connected to block 404 labeled "Subperiod Counter≧16" which also has NO and YES outputs. The NO output is connected back as a second input to the gate 372 to repeat the charging cycles, and the YES output is connected to block 406 labeled "Period Counter=Period Counter+1". The output of the block 406 is connected to block 408 labeled "Period Counter≧4" which likewise has YES and NO outputs, the YES output being connected to block 410 labeled "Total Time=Total Time+1" which is provided to advance the charging sequence to the succeeding charging sequence. The NO output of the block 410 is connected back as a second input of the gate 346 located in the control for the cell pointer to control which battery will be charged. This control is used, for example, to skip the charging of a battery that is incapable of being charged or which is fully charged. The block 410 has its output connected to block 412 labeled "Total Time≧60" which is an arbitrary total possible time available to charge all of the batteries connected into the system. When the charging time has reached or exceeded 60 minutes, the system will return to its initial condition and no further charging will take place. The total time of a charging sequence can be varied as required although for many batteries including the Ni-CD batteries of the type most suitable for the present invention a 60 minute total fast charge time period is a reasonable and satisfactory time.

The YES output of the block 412 is applied as an input to block 414 labeled "Cell Pointer N=1" which has its output connected as a first input of gate 416. The NO output of the block 412 is connected as one input of another gate 418 which has its output connected back to the gate 256, which is the gate that immediately follows those portions of the flow charge that initialize the operating conditions and occurs at the beginning of a charging operation. This establishes the conditions necessary to produce another charging operation for a similar type set of batteries.

The output of the gate 416 is connected to block 420 labeled "Cell No Charge Flag Set?" which is a charge terminating condition that occurs after each charging operation. The gate 420 has a YES output to indicate the charge operation is complete connected to another gate 422 and a NO output connected as an input to block 424 labeled "Set Cell Trickle Flag". The block 424 has an output connected to the other input of the gate 422 which in turn controls block 426 labeled "N=N+1". The output of the block 426 is connected to block 428 labeled "N≧M" where M represents the number of cells that are fully charged. The block 428 has its YES output connected as a second input to the gate 418 described above, and its NO output connected as the second input to the gate 416 also previously described. Until all of the cells are charged, the gate 428 will prevent the block 420 from receiving a signal from the block 414 through the gate 416.

The flow chart described offers a convenient tool for understanding the programming of the subject battery charger. Particular values for the various parameters, however, may vary widely depending on the size and type of cells or batteries to be charged, the cell voltages and charging currents, and the ambient temperature range suitable for charging, the length of each charging period, the total charging time and the number of cells or batteries to be charged in a charging operation. Generally speaking, when a plurality of batteries, such as four, are to be charged they are installed in the device and each battery will receive predetermined time spaced charges. Typically each battery will be individually charged during spaced periods such as 16 cycle periods whereupon the charge for that battery will stop and a succeeding battery at some later time will receive a similar charge for a like period. Each battery, in turn and in sequence will receive periodic charges during subperiods during the full preestablished charge period of 60 minutes or until it is determined that a battery is fully charged. As explained, the present device includes means for sensing the open circuit voltage and the closed circuit voltage of each battery each time it receives a charge. These voltages, for each charge cycle are subtracted from each other to produce a difference voltage and these difference voltages are compared, during each cycle, with the minimum value of this same difference stored in the microprocessor, and when the ratio of the last computed difference to the stored minimum value of the difference exceeds some predetermined value, charging of that battery is terminated except possibly for trickle charging for charge maintenance purposes during its subsequent charging subperiods. This is done individually for each battery being charged. This means that when charging four batteries, as each battery becomes fully charged it is thereafter trickle charged (or not charged at all) while the charging sequence for the other three batteries will continue to repeat, passing over but not skipping, the time interval assigned to the fully charged battery, until all batteries are fully charged or 60 minutes have elapsed. For a typical 60 minute charging time period one or more of the batteries may become fully charged before the end of the charging period, but the total length of the charging period will not change. This means that by the end of the charging period, not all of the connected batteries may still be receiving a fast charge.

It is important to note that not only are open circuit and closed circuit cell voltage readings taken repeatedly, but also the ambient temperature and cell current readings are repeated, and if they get out of range, will function to prematurely terminate a charging operation.

The present charger may also include other backup means to terminate a charging operation with respect to one or more of the batteries under charge. One such back up termination means that can be used and can be programmed into the same system making use of the same basic hardware and programming described also makes use of certain voltage readings taken during each charging cycle of each battery. For example, after each charge cycle is completed the open circuit (non charging) voltage of each cell will be read and compared with the same voltage that was read and stored during the previous cycle. The result of this comparison controls the counting or resetting of an internal software counter. Normally, it would be expected that each new value of OCV will be equal to or greater than than the previously read and stored OCVs as a charging operation proceeds. In this case the software counter is reset to zero. However, if the present value of the OCV voltage is less than the last read value of the OCV, the counter will be incremented (one added to it). This process is then repeated on subsequent charge cycles. If the value of the counter reaches 2 or 3 the charge process is not proceeding normally and the charge will be terminated. This backup termination feature is expected to be less likely to take place and cause termination than the termination means described above, and is provided to clearly indicate a condition which is extreme enough to cause charge termination. This backup can be implemented with the sam circuit and flow chart described above modified to include a further voltage storage and comparison means.

Thus, there has been shown and described a novel electronic battery charger device which fulfills all the objects and advantages sought therefor. It will be apparent to those skilled in the art, however, that many changes, modifications, variations and other uses and applications of the subject device are possible. All such changes, modifications, variations and other uses and applications which do not depart from the spirit and scope of the invention are deemed to be covered by the invention which is limited only by the claims which follow.

What is claimed is:

1. A device for charging one or more batteries comprising a circuit having terminal means for connecting to the terminal means on one or more batteries to be charged, said circuit including a source of electric energy, controllable switching means connected respectively between the energy source and each battery to be charged, a microprocessor having a control connection to each of the controllable switching means for controlling communication between the energy source and the respective batteries to be charged, said microprocessor including means to sequentially control the switch means to supply charging current to the batteries one at a time in repeating periods, means responsive to the voltage across the terminals of each battery prior to and during each charging period thereof operatively connected to the microprocessor, said microprocessor being programmed to calculate the difference between the battery terminal voltage of each battery prior to and when it is being charged, means to store for each battery the minimum value of said voltage difference during each charging period, and means to terminate a charging operation for a battery when the battery terminal voltage difference being calculated exceeds the minimum stored value of the battery terminal voltage difference by a predetermined amount.

2. The device of claim 1 including means to compare the value of the terminal voltage of each battery during succeeding charging intervals, and means to terminate a charging operation for a battery when the terminal voltage of a battery decreases during a predetermined number of succeeding charging periods.

3. The device of claim 1 wherein the microprocessor includes timer means for controlling the switching means to individually apply battery charging energy from the energy source respectively to each of the batteries to be charged in a repeatable sequence of charging and non charging periods.

4. The device of claim 1 including first and second sources of charging current one of which is substantially greater than the other, the microprocessor including means for selecting between the first and second sources of charging currents for applying to the respective batteries to be charged depending on at least one parameter of each battery.

5. The device of claim 1 wherein the source of electric energy includes means for producing a fast charge rate, a fast trickle charge rate and a slow maintenance trickle charge rate, the microprocessor including means to select between these rates for applying charging current to the respective batteries.

6. The device of claim 1 wherein the microprocessor includes means responsive to battery terminal voltage to terminate the application of a charging current to a battery if the terminal voltage of the battery during a charging operation exceeds some predetermined voltage.

7. The device of claim 1 wherein the microprocessor includes means to prevent the application of charging current to selected batteries if the terminal voltage of said selected batteries is equal to or less than a predetermined voltage.

8. The device of claim 1 wherein the microprocessor includes means to prevent the application of charging current to a battery if the voltage of said battery exceeds a predetermined voltage.

9. The device of claim 4 wherein the microprocessor includes means for selecting between the first and second battery charging currents for each battery to be charged depending on the magnitude of the battery terminal voltage.

10. The device of claim 1 wherein the microprocessor includes means for reducing the charging current applied to a selected battery when the battery terminal voltage of said selected battery is within a predetermined voltage range.

11. The device of claim 1 including indicator means associated with each battery being charged to indicate the status thereof, each of said indicator means being connected to the microprocessor and energizable thereby to indicate the charging status of the associate battery.

12. The device of claim 11 wherein the indicator means include a light producing device associated with each battery to be charged.

13. The device of claim 11 wherein the microprocessor includes means to energize each indicator means to indicate that the associated battery is being fast charged, trickle charged, fully charged or is not being charged.

14. The device of claim 1 wherein the switching means associated with each battery includes a Darlington circuit.

15. The device of claim 1 wherein the switching means associated with each battery includes a silicon controlled rectifier.

16. The device of claim 1 wherein the switching means associated with each battery includes a mosfet.

17. The device of claim 1 wherein the switching means associated with each battery includes a gate turn-off SCR (GTO).

18. The device of claim 1 wherein the switching means associated with each battery includes a relay.

19. The device of claim 1 wherein the switching means associated with each battery includes a bipolar power transistor.

20. A battery charger device comprising
a circuit having terminal means for connecting to terminals of batteries to be charged, said circuit including a source of charging energy and separate switch means for connecting said energy source to each battery to be charged,
means including microprocessor means connected to said switch means to control electrical communication between the energy source and the respective batteries,
means in the microprocessor for producing a sequence of distinct charging intervals for the batteries when the respective switch means are closed and the associated batteries are charging separated by non charging intervals when the switch means are open,
means for reading the battery terminal voltage of each battery prior to and during each of its charging intervals,
means for computing the difference between the battery terminal voltage prior to and during each succeeding charging interval for each battery to be charged,
means for storing a value representing the minimum value of the difference between the terminal voltage prior to and during each charging interval, including means for comparing the stored minimum value of the voltage difference with each computed value thereof for each battery during each battery charging operation and replacing the stored minimum value with each subsequent computed value that is less than the stored minimum value, and means to terminate a battery charging operation for a battery when the ratio of the computed voltage difference to the stored minimum value of the difference exceeds some predetermined amount.

21. The battery charger of claim 20 wherein the circuit terminal means include means for connecting a plurality of batteries to be charged, switch means associated with each battery to be charged, the microprocessor means including means to establish a time ordered sequence of charging and non charging intervals such that the charging intervals for each battery of said plurality occur at distinctly different times so that only one battery at a time receives a charge.

22. The battery charger of claim 20 including means responsive to the ambient temperature of each battery to be charged, and means to terminate a charging operation if the ambient temperature equals or is less than a predetermined temperature.

23. The battery charger of claim 20 including means responsive to the ambient temperature of each battery to be charged, and means to terminate a charging operation if the ambient temperature equals or is greater than a predetermined temperature.

24. The battery charger of claim 20 including means to terminate a battery charging operation for a battery if the battery terminal voltage equals or exceeds a predetermined voltage.

25. The battery charger of claim 20 including means to terminate a battery charging operation for a battery if the battery terminal voltage equals or is less than a predetermined voltage.

26. The battery charger of claim 20 including means responsive to battery charging current for each battery during a battery charging interval, and means to terminate a charging operation if the battery charging current equals or exceeds a predetermined charging current.

27. The battery charger of claim 20 including means to establish a battery trickle current charge rate, means responsive to battery charging current during a battery charging interval, and means to apply the trickle current charge rate to a battery if the battery charging current equals or is less than a predetermined charging current.

28. The battery charger of claim 20 wherein the battery is a nickel cadmium battery.

29. The battery charger of claim 20 wherein the microprocessor includes means for establishing a charging period of predetermined duration during which it is expected that all of the batteries connected thereto will be fully charged.

30. The battery charger of claim 20 including means to establish at least two different second battery charging rates, one of said rates being substantially greater than another of said charging rates, and means to select between the charging rates depending on a predetermined parameter of a battery to be charged.

31. A battery charger device having means for charging a plurality of the same or of different type batteries such that all batteries of the same type are charged at substantially the same fast charging rate during predetermined equal length repeating time periods comprising
a circuit having a plurality of connection means for connecting to the terminals of batteries to be charged,
a source of charging energy,
separate switch means connected between the energy source and each battery and operable between an open non charging condition and a closed charging condition permitting substantially the same fast charging current from the energy source to pass through the associated battery during each equal length repeating charging period thereof,
microprocessor means including means for controlling the condition of the switch means, means to establish predetermined equal length repeating charging periods for each battery, means to establish a charging sequence whereby each of said plurality of batteries in order has distinctive spaced equal length time subperiods when it is being charged followed by a non charge interval,
separate means associated with each battery responsive to battery terminal voltage, battery current, and battery ambient temperature connected to the microprocessor, and
means in the microprocessor for terminating a battery charging operation with respect to any one or more of the plurality of batteries if any one or more of the following occur, the battery voltage of the battery whose charge is to be terminated equals or exceeds for that battery a first predetermined voltage, equals or is less than a second predetermined voltage, if the battery charging current for that battery equals or exceeds a predetermined current, or if the ambient temperature of the battery equals or exceeds a first predetermined temperature or equals or is less than a second predetermined temperature.

32. The battery charger of claim 31 wherein the microprocessor includes means for establishing first and second battery charging rates, the first charging rate substantially exceeding the second charging rate.

33. The battery charger of claim 31 including means to compare the battery terminal voltage during succeeding charging subperiods for each battery, and means to terminate a charging operation with respect to a battery when the battery voltage decreases during a predetermined number of succeeding charging subperiods.

34. The battery charger of claim 31 including a display device associated with each battery to be charged, said microprocessor including means to energize each of said display devices to indicate the charging status of the associated battery.

35. Apparatus for fast charging a battery comprising a circuit having a power supply including a portion for supplying charging current to a battery being charged, said power supply portion including means to select between supplying a fast charge current or a trickle charge current to the battery, controllable switch means connected between the power supply portion and the battery, control circuit means operatively connected to the switch means to close and open the switch means to establish a charging and a non charging condition, program means for establishing a series of time spaced charging and non charging conditions, means to establish a predetermined overall time period for charging the battery when applying a fast charge current, means to read the battery terminal voltage for each battery prior to and during each fast charging condition, means to calculate the absolute value of the difference between these battery terminal voltages for each charging condition, means during each overall time period for storing the minimum value of the calculated difference including means to replace a previously stored value with each newly read and calculated value that is less than the previously stored minimum value, means to compute the ratio of each newly calculated value of the voltage difference to the minimum stored value thereof including means to terminate a fast charge condition when the ratio is greater than some predetermined value.

36. The apparatus of claim 35 including means to change from producing fast charge conditions to producing slow trickle charge conditions when the fast charge condition is terminated.

37. The apparatus of claim 35 wherein the overall time period established is about 60 minutes.

38. The apparatus of claim 35 wherein the battery is a nickel cadium battery.

39. The apparatus of claim 35 wherein batteries capable of being fast charged have a recognizable marking, means to read said markings, and means to select between a fast charge, a trickle charge or no charge based on the reading of said markings.

40. The apparatus of claim 35 wherein batteries capable of being fast charged have a recognizable dimensional characteristic, means to sense said characteristic, and means to select between a fast charge and a no charge based on a sensing of this characteristic.

41. The apparatus of claim 35 including a back up fast charge condition termination means including means to compare the battery terminal voltage during succeeding charging conditions, and means to terminate a fast charge condition when the battery terminal voltage of a battery decreases during a predetermined number of succeeding charging periods.

42. The apparatus of claim 35 including means to prevent a charging operation if the battery terminal voltage during a non charging condition exceeds some predetermined voltage for the type of battery being charged.

43. The apparatus of claim 35 including means to terminate a charging operation when the overall time period has expired.

44. The apparatus of claim 35 including means to read ambient battery temperature, said means including means to terminate a charging condition if the ambient temperature exceeds some predetermined temperature.

45. The apparatus of claim 35 including means for fast charging a plurality of batteries of differing type and charge condition, said circuit means including means for establishing distinct periods for the charging conditions reserved for each battery of said plurality.

46. The apparatus of claim 45 wherein the means for establishing distinct periods includes means for establishing the charging and non charging periods for each battery.

47. A method of rapidly and efficiently charging one or more than one batteries of a type in which the voltage characteristics thereof varies with the state of charge of the battery comprising the steps of:
connecting one or more batteries to be charged to a battery charger that includes means for supplying electrical energy for charging the batteries,
establishing a time sequence for supplying energy to each of the batteries one at a time in time-spaced intervals so that each battery undergoes periodic charging and non charging intervals,
reading the voltage across each battery being charged prior to and during each charging interval thereof,
computing the difference between the battery voltage read prior to and during each succeeding charging interval for each battery,
storing the value of the said calculated voltage difference between the battery voltage prior to and the battery voltage during each succeeding charging interval including updating the stored difference voltage when the calculated difference voltage is less than the value previously stored, and
terminating a battery charging operation for a battery when the ratio of the present value of the computed voltage difference therefor to the stored minimum value of the voltage difference for said battery exceeds a predetermined ratio.

48. The method of claim 47 including the further step of comparing the terminal voltage of each battery during a portion of each succeeding charging cycle thereof and terminating a battery charging operation for a battery when terminal voltage of a battery decreases during a predetermined number of succeeding charging intervals.

49. The method of claim 48 wherein the terminal voltage being compared is the open circuit battery voltage.

50. A battery charger device having means for charging a plurality of batteries over a predetermined time period comprising
a circuit having a plurality of connection means for connecting to the terminals of batteries to be charged,
a source of charging energy,
a separate switch means connected between the energy source and each battery and operable between an open non charging condition and a closed charging condition permitting charging current from the energy source to pass through the associated battery,
microprocessor means including means for controlling the condition of the switch means, means to establish a predetermined charging period, means to establish a charging sequence whereby each of said plurality of batteries in order has distinctive spaced timed subperiods when it is being charged followed by a non charge interval,
separate means associated with each battery responsive to battery terminal voltage, battery current, and battery ambient temperature connected to the microprocessor,
means in the microprocessor for terminating a battery charging operation with respect to any one or more of the plurality of batteries if any one or more of the following occur, the battery voltage of the battery whose charge is to be terminated equals or exceeds a first predetermined voltage, equals or is less than a second predetermined voltage, if the battery charging current equals or exceeds a predetermined current, or if the ambient temperature of the battery equals or exceeds a first predetermined temperature or equals or is less than a second predetermined temperature, and
means in the microprocessor for computing the difference between the battery terminal voltage for each battery prior to and during each charging subperiod, means to store the computed voltage difference for each battery including means to replace the stored difference for each battery by a succeeding difference that is less than the previously stored difference, and means to terminate a charging operation with respect to a battery when the ratio of the computed voltage difference value to the stored minimum difference exceeds some predetermined amount.

* * * * *